United States Patent
Mann et al.

(10) Patent No.: US 7,500,597 B2
(45) Date of Patent: Mar. 10, 2009

(54) CONFIGURABLE INTERFACE CONFIGURATION METHOD AND SYSTEM USING A REMOTE INTERFACE

(75) Inventors: Joseph Francis Mann, Waukesha, WI (US); Krista Mann, Waukesha, WI (US); Clinton Duane Britt, Milwaukee, WI (US); Robert F. Lloyd, Muskego, WI (US); Steven Mark Cisler, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 688 days.

(21) Appl. No.: 11/050,923

(22) Filed: Feb. 4, 2005

(65) Prior Publication Data
US 2006/0178760 A1    Aug. 10, 2006

(51) Int. Cl.
*G06F 17/00* (2006.01)
(52) U.S. Cl. .................................................. 235/375
(58) Field of Classification Search .................. 235/375
See application file for complete search history.

(56) References Cited

U.S. PATENT DOCUMENTS 7,013,351 B2 * 3/2006 Bracewell et al. ........... 709/246

2001/0034879 A1    10/2001  Washington et al.
2003/0105535 A1     6/2003  Rammler

FOREIGN PATENT DOCUMENTS

WO        WO 01/67192 A     9/2001

OTHER PUBLICATIONS

English, Londer, Shell, Bleeker, Cawood, "Microsoft Content Management Server 2002: A Complete Guide", Oct. 27, 2003, Addison Wesley Professional, XP 002402811.

* cited by examiner

*Primary Examiner*—Jamara A Franklin
(74) *Attorney, Agent, or Firm*—Fletcher Yoder; Alexander R. Kuszewski (57)    ABSTRACT

Embodiments of the present invention relate to a system and method of reconfiguring a human-machine interface. In accordance with embodiments of the present techniques, a configuration application stored on a human-machine interface may be accessed by a remote configuration station via a browser that cooperates with a server resident on the human-machine interface. The configuration application is adapted to allow reconfiguration of the human-machine interface via the browser. Additionally, control objects may be accessible via the browser to create a display file in accordance with the present techniques. The display file may provide links to the control objects that are accessible to a user via the human-machine interface. Further, the display file may be implemented on the human-machine interface for display and execution of the links to the control objects.

28 Claims, 7 Drawing Sheets

CONFIGURABLE INTERFACE CONFIGURATION METHOD AND SYSTEM USING A REMOTE INTERFACE

BACKGROUND

The present invention relates generally to the field of terminals and equipment interfaces. More particularly, embodiments of the present invention relate to techniques for accessing, configuring, and creating applications for utilization on such terminals and interfaces.

Interface devices generally implement electronic tools or applications. In an industrial context, for example, such interfaces may be provided on a stand-alone device or a computer terminal. While the interface may interact with local software and/or hardware only, many are adapted for networked use in monitoring and/or control of system functions relating to a process or piece of industrial equipment. In certain settings, these are referred to as human-machine interfaces (HMI).

An HMI may include a device or application adapted to present information to an operator about the state of a process or system and/or to accept and implement instructions received from the operator. Further, an HMI may be adapted to interpret process information and guide interactive procedures between an operator and a system. For example, an HMI may provide historical data, real-time value data, dynamic process values in a system and so forth. Such data may be useful in guiding an operator through operations in response to status changes in a system. Indeed, the HMI may present information in the form of charts, graphs, lists and so forth to facilitate access to system parameters and to provide clear guidelines to an operator in any monitoring or control function. Such data may provide information relating to the status and operation of any sensor or actuator, and often many such devices. These may include motors, valves, temperature elements, pressure sensors, and material handling equipment (e.g., conveyors, stackers, pumps, etc.) to mention only a few.

HMIs are typically configured to operate with a particular system (e.g., a processing plant) or piece of equipment (e.g., a compressor) through the use of process integration software. For example, a terminal comprising an HMI or on which an HMI is installed may interface with a system or piece of equipment using a set of specially-configured HMI graphic screens developed for use with a certain process integration software application. Such software applications typically function with a specific type of terminal and are configured to relate to a particular system or piece of equipment. Further, in existing techniques, these applications are generally created either directly on the terminal or are downloaded from a computer after being assembled on the computer using specialized configuration software.

Some existing HMIs are configured directly on the terminals themselves. For example, graphical interfaces for these terminals are generally created using proprietary protocols that reside within the terminal or that partially form aspects of the terminal. Indeed, such terminals are essentially integral to the process of creating the interfaces that the terminals themselves will utilize. In other words, terminals such as these are typically not flexible enough to allow the creation of resident graphical interfaces without the terminal being present during configuration and development. Some existing approaches to the interface configuration are adapted to utilize offline programming packages to create screens without the interface terminal being present. For example, a user may create an application having interface graphics (e.g., an operable button or dynamic gauge) on a configuration station and then proceed to download the application into the interface terminal. This type of downloading operation comprises the utilization of a conversion program, such as an off-line programmer (OLP).

Conversion programs are used in existing HMI configuration techniques to convert applications into information that a designated HMI is capable of reading and executing. Such conversions enable the use of external programming software (i.e., software that is separate from the HMI) for the development and configuration of the HMI (e.g., the creation of HMI graphics on external development software). It should be noted that while such conversion applications are generally effective, they may introduce various problems into the creation and operation of an HMI application. For example, a particular OLP or the ultimate interface developed through its use may function improperly, thus introducing unreliability into the operation of an HMI and into a process with which the HMI interfaces. Additionally, using and creating conversion applications is often time consuming, inefficient, and costly. For example, new revisions in an integration software package may necessitate creation of a new OLP to enable conversion of a new type of functionality. Often different versions of the OLP must support different operating systems of the programming station, as well as numerous HMIs. Updating such programming packages thus becomes extremely complex and expensive. Time-to-market is also slowed for any new introductions, of OLP software, HMI hardware, and ultimately for the systems with which the programmed HMIs are intended to operate.

Additionally, existing terminal configuration techniques typically require that the external configuration software be installed on each configuration station used for making and or downloading application changes, updates, and so forth. For example, two general purpose computers adapted for use in configuration of an HMI may both need to have programming software installed. If each computer is not properly updated, software version conflicts may arise with existing techniques. For example, a portion of an application may be developed with old software and another portion may be developed with updated software. This may be a problem because version conflicts may create inconsistencies in operation. Additionally, the potential for version conflicts may create inefficiency in maintenance. Indeed, if multiple configuration stations are used, implementing improvements or changes to the actual configuration software may require considerable time and expense for installation on each workstation.

Accordingly, there is a need for a more efficient, robust, and cost effective technique for creating and configuring terminals and related applications.

BRIEF DESCRIPTION

Embodiments of the present invention relate to a system and method of remotely or directly configuring a configurable interface without necessitating the use of external programming software and thus without necessitating the use of a conversion program (e.g., a specialized OLP) or downloads. Exemplary features of the invention are described in this section. Additional and alternative features and embodiments will be discussed in further detail below.

In accordance with embodiments of the present techniques, a development environment may include reconfiguration tools, functional modules or control objects, and a set of screen instructions stored on an HMI. The development environment or portions thereof are remotely accessible through a server application on the HMI. Additionally, in accordance with present embodiments, the development environment may be adapted for communicating directly with a browser (e.g., a remote access tool or web browser) via the server software, thus facilitating access and reconfiguration in the development environment. Indeed, the functional modules and screen instructions may be reconfigured for various functions. In accordance with present techniques, the functional modules may be adapted to generate configurable views to be displayed on a screen, interpret inputs received via an input device, process parameter signals received from remote devices, and generate output signals for reporting to or controlling remote devices. It should be noted that the control objects or functional modules may reside on the HMI and additional control objects may be stored at a remote accessible location (e.g., in an object library). The screen instructions in accordance with the present techniques may be configured for generating the configurable views and calling upon the functional modules based upon inputs received via the input device.

The development environment residing on the HMI in accordance with embodiments of the present techniques may be accessed locally or remotely, typically via a browser application. For example, in accordance with present techniques, a configuration application (e.g., programming software) may reside on the HMI and provide a development environment that resident server software (e.g., web server) can make available to remote users (e.g., via a network) or a local user through a local browser or similar application. Additionally, the development environment may be directly available to users through the server and browser applications via a development pipeline or development tool set. Thus, in accordance with present techniques the functional modules and the screen instructions may be reconfigured from a remote configuration station through a browser directly and/or via the web-based reconfiguration tool. Upon reconfiguration of the functional modules or screen instructions, the updated version may be implemented in the HMI by switching between the development environment and an operational environment (e.g., an operational mode of the HMI) without requiring a download from the configuration station. Indeed, in embodiments where the functional modules and screen instructions communicate directly with the browser, changes through the browser result in direct changes to the functional modules and screen instructions. For example, embodiments of the present techniques include the ability to make changes "on the fly" without switching between development mode and operational mode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate generally to the field of configurable interfaces. In the present context, a "configurable interface" may include any human interface device having embedded and dedicated code for accessing settings and displaying user-viewable views or screens based upon such settings. The interface may, in many contexts, read and write data from and to remote memory and particular registers, such as for interfacing with a process or machine. In other contexts, the interface may simply access and display data in a stand-alone architecture. For example, embodiments of the present invention relate to industrial computer terminals, equipment interfaces (e.g., programmable logic controllers and software interfaces), and related devices such as those used in industrial and commercial settings. The computer terminals, equipment interfaces, and related applications may generally be referred to as human-machine interfaces (HMIs), man-machine interfaces (MMI), graphical user interfaces (GUI), user interfaces (UI), operator interfaces (OI), and so forth. An HMI may include a process that displays graphics and enables user interface with a monitoring and/or control system, typically in graphic form. More particularly, embodiments of the present invention relate to techniques for operation of HMIs and accessing, configuring, and creating applications for utilization with such HMIs.

Figure 1:
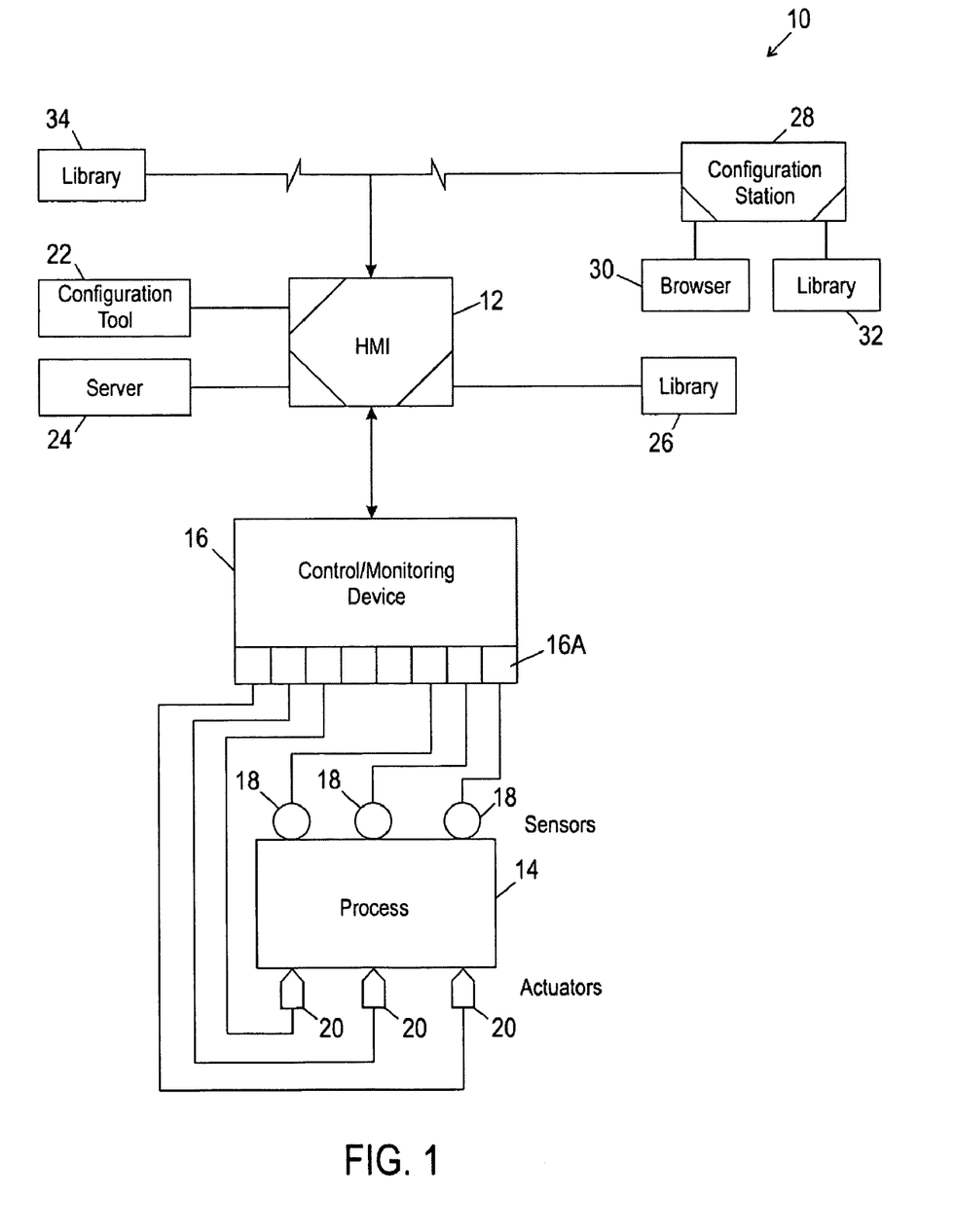
FIG. 1 is a diagrammatical representation of an exemplary control and monitoring system including a configurable interface adapted to interface with networked components and configuration equipment in accordance with embodiments of the present techniques.

FIG. 1 is a diagrammatical representation of an exemplary control and monitoring system including an HMI adapted to interface with networked components and configuration equipment in accordance with embodiments of the present techniques. The control and monitoring system is generally referred to by reference numeral 10. Specifically, the control and monitoring system 10 is illustrated as including an HMI 12 adapted to interface with components of a process 14 through a control/monitoring device 16 (e.g., terminal block or controller).

It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements. It should also be noted that, while reference is made in the present discussion to networked systems and to systems incorporating controllers and other equipment, the HMI and programming techniques described may be equally well applied to non-networked components (e.g., GPS displays, game displays) and to networked systems outside the industrial automation field (e.g., facilities management, commercial settings, automotive and vehicular interfaces, etc.).

The process 14 may take many forms and include devices for accomplishing many different and varied purposes. For example, the process may comprise a compressor station, an oil refinery, a batch operation for making food items, a mechanized assembly line, and so forth. Accordingly, the process 14 may comprise a variety of operational components, such as electric motors, valves, actuators, temperature elements, pressure sensors, or a myriad of manufacturing, processing, material handling and other applications. Further, the process 14 may comprise control and monitoring equipment for regulating process variables through automation and/or observation. For example, the illustrated process 14 comprises sensors 18 and actuators 20. The sensors 18 may comprise any number of devices adapted to provide information regarding process conditions. The actuators 20 may include any number of devices adapted to perform a mechanical action in response to an input signal.

As illustrated, these sensors 18 and actuators 20 are in communication with the control/monitoring device 16 (e.g., a programmable logic controller) and may be assigned a particular address in the control/monitoring device 16 that is accessible by the HMI 12. It should be noted that in some embodiments of the present techniques, the sensors 18 and actuators 20 are in direct communication with the HMI 12. These devices (sensors 18 and actuators 20) may be utilized in accordance with embodiments of the present techniques to operate process equipment. Indeed, they may be utilized within process loops that are monitored and controlled by the control/monitoring device 16 and/or the HMI 12. Such a process loop may be activated based on process inputs (e.g., input from a sensor 18) or direct operator input received through the HMI 12.

It should be noted that references to a "browser" for viewing and modifying configuration of the interface are intended to be exemplary only. More generally, such software may be referred to as "general purpose viewers". That is, the server software on the interface permits viewing of the development environment, and direct reconfiguration of the interface (particularly of virtual components and their associated appearance and functionality) without the need for special viewing or configuration software.

The HMI 12, in accordance with embodiments of the present techniques, may be thought of as including instructions for presenting one or more screen views, and functional modules or control objects executed upon interaction with the HMI by reference to the screen views. The screen views and control objects may be defined by any desired software or software package. For example, the screens views and control objects may be defined by a resident configuration application 22. In accordance with present embodiments, the screen views and control objects may be described as independent executable pieces of software. In a present implementation, the screen views are defined by appropriate code written in a markup language (e.g., Hypertext Markup Language or HTML). Thus, as described in greater detail below, the configuration of graphical interface screens for the HMI may be performed without the use of conversion programs. Further, in accordance with embodiments of the present technique, the screen views may be developed directly on the HMI via resident server software (designated as server 24) that makes the resident development environment available for remote access. Indeed, in accordance with embodiments of the present techniques, a development environment may be accessed via a browser, thus eliminating the need to download changes to the screens and to update remote configuration software applications.

The functional modules or control objects generally include pre-defined computer code that performs a desired function. Each object may be considered generally to have various "properties," with typical properties including inputs (e.g., register locations on a networked device from which information is drawn), functions (e.g., transformations performed or calculations made based on the inputs), and outputs (e.g., registers of networked devices to which information is to be written). For example, a particular property may correspond to a register 16A of control/monitoring device 16. In a simple case, an object may simply access a piece of data (e.g., a state of a component as determined by a sensor), and generate an output signal to write a value corresponding to the state of a different networked device. Much more complex functionality can, of course, be configured. In an industrial control and monitoring context, for example, such objects may emulate operation of a momentary contact push button, a push button with delayed output, a switch, and so forth. It should be noted that functional modules in accordance with present embodiments may be adapted to communicate directly with a browser (e.g., a web browser). For example, the functional modules may be configurable via a markup language (e.g., HTML). Accordingly, an object illustrated for configuration on a browser is the actual object (e.g., graphical button, simulated read out, simulated meter, etc.).

Many pre-programmed functional modules or control objects may be available for use by the HMI. Such functional modules may be accessible via a network, resident on the HMI or resident on the terminal on which the software HMI is installed. The screen instructions may call upon the control objects for performing desired functions based upon operator inputs. For example, the operator may provide initiating inputs by touching a location on a touch screen or depressing keys on a keyboard. Based upon the screen instructions and the control objects associated with the instructions (e.g., with specific locations triggering calls or execution of pre-configured control objects) the desired functions may then be executed. Accordingly, the operator is enabled to interact with the process, typically to change screen views, write to registers, or command the generation of other output or control signals.

In an HMI in accordance with present embodiments, one or more separate interface screens may be employed, with some HMIs having many such screens and a great number of control objects. Each control object may, in turn, be uniquely programmed to consider specific inputs, perform specific functions, and generate signals for specific outputs. Moreover, any suitable code may be employed to devise the functional modules or control objects. In a present implementation, the control objects are Microsoft Active X objects. Indeed, a library 26 of available control objects (e.g., Active X components) may reside on the HMI 12 to facilitate configuration of the HMI 12, as described below. While the HMI 12 may be configured directly on the HMI 12 itself, embodiments of the present techniques enable configuration (e.g., access to a development environment) on a remote configuration station 28. For example, embodiments of the present techniques provide access directly to the resident library 26 and/or configuration application 22 via a browser 30 or similar application. In a present implementation, no other specialized software is required at the configuration station 28. Indeed, the server 24 resident on the HMI 12 may provide access to the control objects in library 26 and the configuration application 22. By storing the control objects in library 26 and/or the configuration application 22 directly on the HMI 12, the risk of version conflicts and so forth are eliminated or reduced. Additionally, it should be noted that embodiments of the present techniques may incorporate an IP address (Internet Protocol address) with the graphical interface to facilitate access to both a development environment and an operation environment of the HMI 12 via a network.

As discussed above, access to the library 26 and configuration application 22 may be provided to the configuration station 28 to facilitate remote development of applications (i.e., screen instructions and associated control objects) for the HMI 12 without necessitating the use of a conversion program or necessitating installation of a configuration tool on the configuration station 28. Indeed, the configuration station 28 (e.g., laptop or workstation) may merely require the browser 30 and a communication, link (e.g., Internet connection, network interface, wireless connection, or USB cable) to gain access to configuration of the HMI 12 through the server 24. In some embodiments, a password or user access status may be required to gain such access. Further, in a presently contemplated embodiment, the configuration station automatically recognizes the HMI or the terminal on which the HMI is resident as a device upon being coupled to the configuration station (e.g., similar to an external memory or drive).

Once the screen instructions and/or control objects then resident on the HMI are accessible to the configuration station 28, aspects of the HMI 12 can be modified or updated directly on the HMI 12 via the communication link from the configuration station 28. For example, a user may wish to update a particular HMI graphic to provide historical data trending relating to information being received from a newly installed sensor 18. Additionally, the user may find it desirable or convenient to update the HMI graphic with such an application while in an off-line mode (e.g., without immediately implementing the changes). In such a scenario, the user may link to the library 26 of available control objects from the configuration station 28 and use them to modify the HMI graphic or functionality in a development environment. As discussed below, such modifications may be made by composing new or modifying existing screen instructions, and by adding, removing, or modifying control objects called or executed in response to user inputs made by reference to the displayed HMI screens. Again, because the control objects available to configure the HMI 12 and/or the configuration application 22 are accessed from the HMI 12 by the configuration station 28 during configuration, concerns relating to revision and capability differences between the configuration application and the HMI 12 are minimal. Indeed, in accordance with some embodiments, the configuration station 28 and HMI 12 do not even need to have the same operating system.

It should be noted that additional control objects can be added to the library 26. For example, if a trending control object is not resident on the HMI 12, a user can download such an object to the HMI 12 from a configuration library 32 resident on the configuration station 28. Alternatively, a user could access the trending control object from a resource library 34 accessible via a network (e.g., the Internet), either directly to HMI 12 or through the configuration station 28. This may be particularly beneficial because new and improved control objects can be downloaded to the HMI 12 individually and on a periodic basis, thus adding new functionality without necessitating the periodic release of new conversion programs. The development environment may provide links to such libraries. Further, in embodiments using a configuration application 22, because the configuration application 22 resides on the HMI 12, version conflicts with the configuration application 22 may be avoided and the necessity for configuration station software upgrades may be eliminated. For example, in accordance with present embodiments, because the configuration application 22 resides on the HMI 12 a new version of software can simply be installed on the HMI 12 without necessitating a change to any software on linked configuration stations. Indeed, as discussed above, the configuration stations may merely require a standard web browser to access a development environment for the HMI 12 provided by the newly upgraded software.

Figure 2:
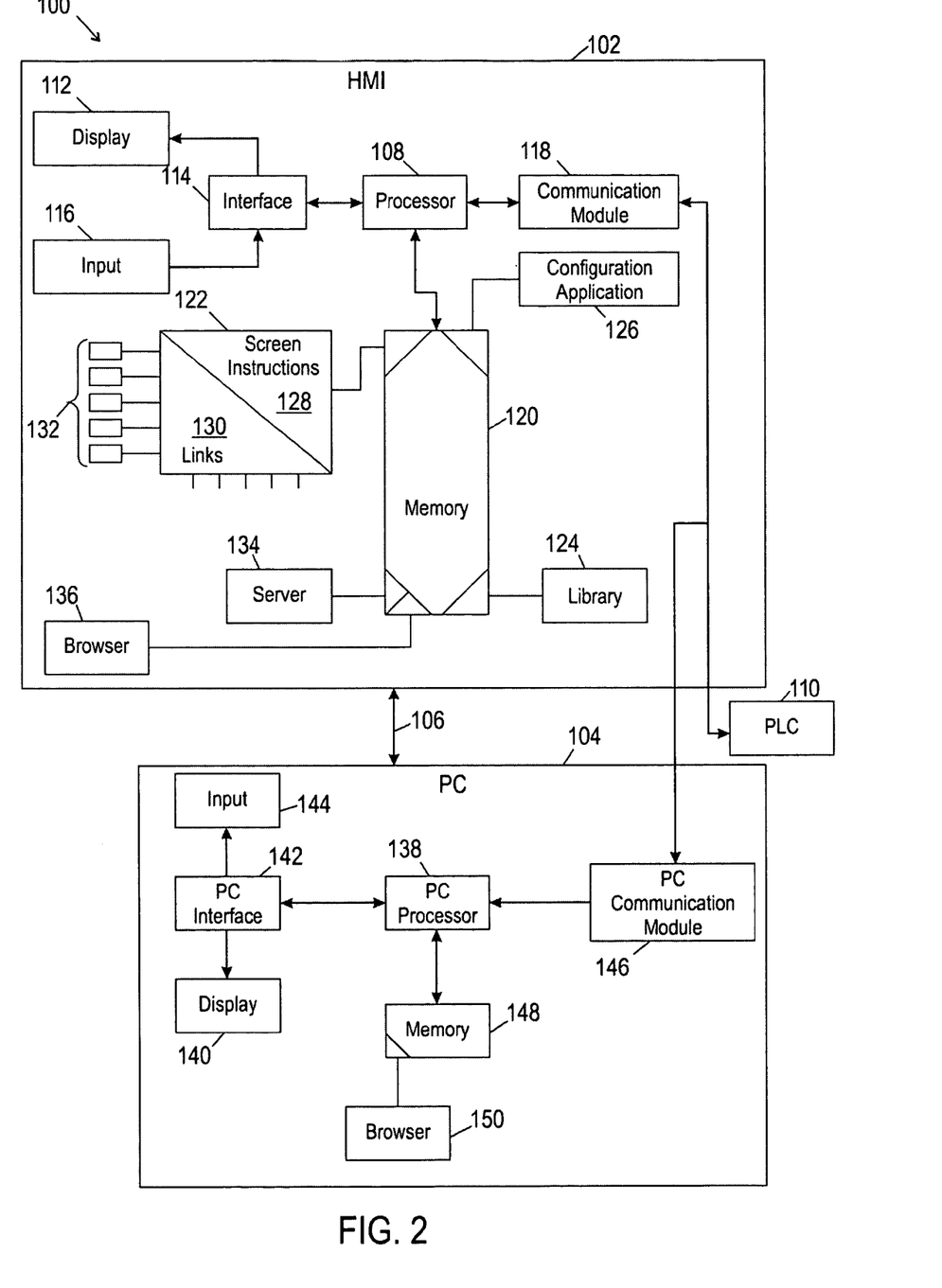
FIG. 2 is a block diagram illustrating interaction among components of both a configurable interface and a configuration station in accordance with embodiments of the present techniques.

FIG. 2 is a block diagram illustrating interaction among components of both an HMI and a configuration station in accordance with embodiments of the present techniques. This interaction diagram may be referred to generally by reference numeral 100. Specifically, the interaction diagram 100 includes an HMI 102 that is in a communicative relationship with a general purpose computer (PC) 104 via data link 106. The data link 106 may comprise a direct cable link, a network link, a wireless link, or any interconnecting circuit between locations for the purpose of transmitting and receiving data. For example, the data link 106 may represent the Internet. Further, both the HMI 102 and the PC 104 are illustrated as comprising certain exemplary components that facilitate operation and communication in accordance with embodiments of the present techniques.

The HMI 102 may comprise a configurable tool built around an HMI microprocessor 108. The HMI 102 may be adapted to interface with an industrial hardware interface such as a programmable logic controller (PLC) 110. While the HMI 102 may comprise many different parts and components, certain exemplary components are presently illustrated to demonstrate aspects in accordance with embodiments of the present techniques. Specifically, in addition to the processor 108, the illustrated embodiment includes a display module 112 (e.g., a graphical component or physical display screen), a display/input interface module 114, an input module 116 (e.g., keypad or touch-screen), a communication module 118 (e.g., TCP/IP component), and memory 120. In accordance with the present techniques, the memory module 120 may store computer programs and components such as a markup language page 122 (e.g., HTML page), a control object library 124, and a configuration application 126.

The markup language page 122 may include any document created in a markup language that can be displayed. Multiple pages, such as page 122, may be stored in memory 120 for utilization in interfacing with a system or process. As discussed above, each such page will typically comprise screen instructions 128 and links 130 to pre-programmed functional modules or control objects. For example, the links 130 may cooperate with certain control objects 132 to facilitate display of system parameters and/or control of a related system or process. The HMI 12 may provide access to such pages and configuration of such pages using a server program 134 (e.g., a web server) stored in memory 120. Additionally, the HMI 12 or an external configuration station (e.g., PC 104) may utilize such pages by employing a standard browser program 136 or 150.

The control objects 132 may comprise modular control strategies and graphical components that enable system configuration. For example, the control objects 132 may include modules for configuring one or more field devices (e.g., inputs and outputs) and related control logic (e.g., expressions). Indeed, these control objects 132 may be adapted to provide reusable configurations for process equipment, sensors, actuators, and control loops. As discussed above, in accordance with embodiments of the present techniques, available control objects may reside in a library stored on the memory module 120. Each control object 132 in accordance with present techniques may include a unique control tag, a data history, a display definition, and a control strategy. Further, each control object 132 may be a separate module, enabling operation, debugging, and transfer of individual objects 132 without affecting other objects. In many settings, and particularly in industrial automation contexts, "families" of such objects may be pre-defined, such as for various types of push buttons, trending modules, and so forth.

As discussed above, the configuration application 126 may cooperate with a separate server application that is stored on the HMI (e.g., server 134) to provide access to configuration of the HMI 102. Alternatively, the application 126 may comprise a server module to perform such a function. A user may remotely configure the HMI 102 from the PC 104 using a browser 136. The configuration application 126 may be adapted to utilize a control object library (e.g., control objects stored on the HMI 102 or control objects accessed from an alternative remote location) to configure the markup language page 122. For example, the configuration application 126 may allow a user to configure the page 122 in a development environment for use as a graphical interface in the HMI 102. This may be achieved by utilizing control objects (e.g., 132) as functional elements. Once configured, the page 122 may be saved as a file, and implemented in an operation mode of the HMI 102, where the page 122 may be utilized as an operable graphical interface. Alternatively, the configuration application 126 may not be necessary because each control object 132 may be an independent executable piece of software that can communicate with a browser. Thus, properties of each control object 132 can be directly manipulated from the browser in accordance with present techniques.

The PC 104, much like the HMI 102, may comprise a general purpose tool built around a microprocessor 138. The illustrated PC 104 is adapted for interface with the HMI 102 through data link 106 to facilitate configuration of the HMI 102. While the PC 104 may comprise many different parts and components, certain exemplary components are presently illustrated to demonstrate aspects in accordance with embodiments of the present techniques. Specifically, in addition to the processor 138, the illustrated embodiment includes a display module 140 (e.g., a graphical component or physical display screen), a display/input interface module 142, an input module 144 (e.g., keyboard), a communication module 146 (e.g., TCP/IP component), and a memory 148. In accordance with the present techniques, the memory module 148 may store computer programs and components such as a browser application 150. In accordance with some embodiments, the browser application 150 may be adapted to display a markup language page, such as page 122. Indeed, the browser 150 may be the equivalent to the browser 136.

Figure 3:
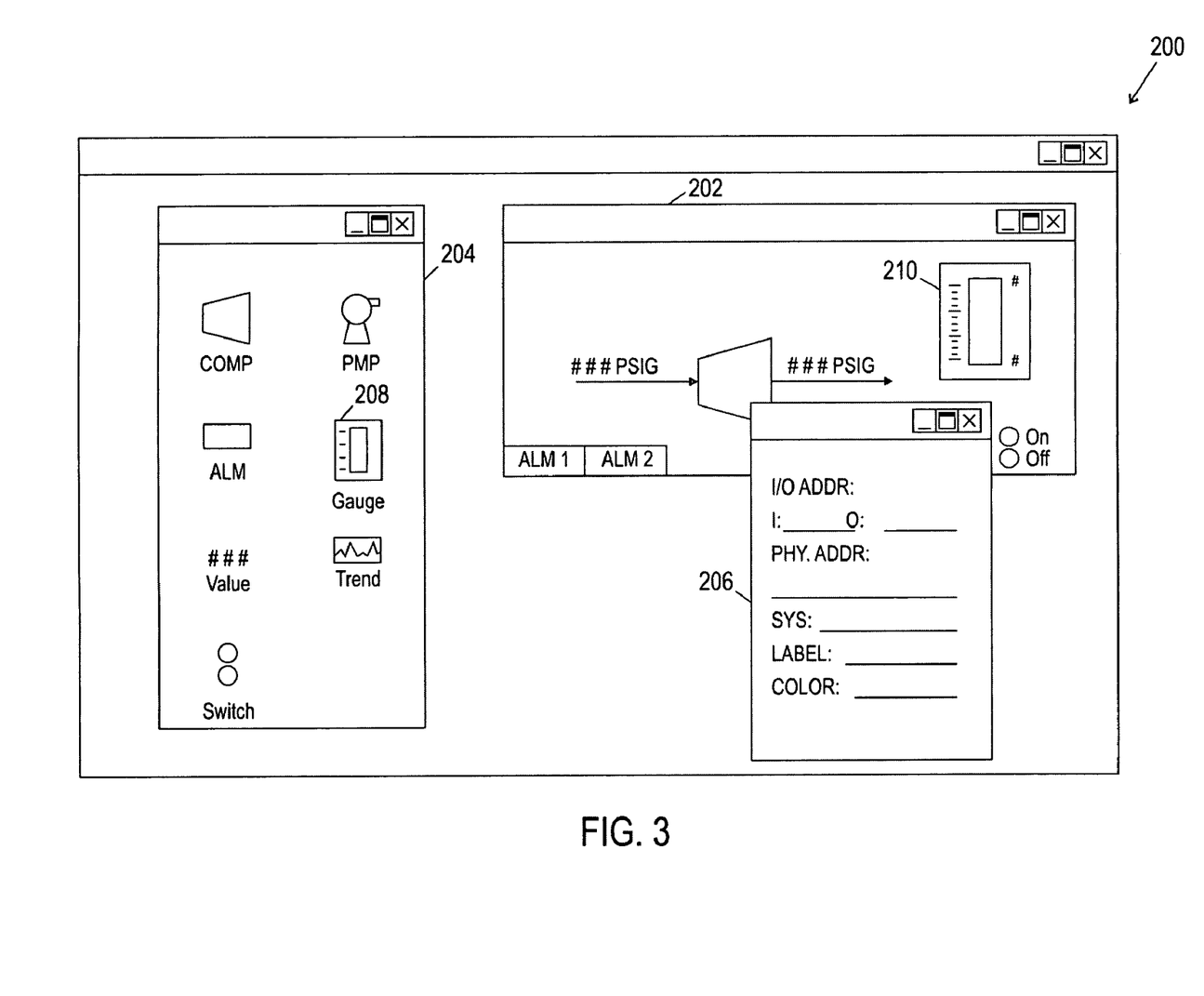
FIG. 3 is an exemplary representation of a configuration screen that is part of a remotely accessible configuration application package in accordance with embodiments of the present techniques.

FIG. 3 is an exemplary representation of a configuration screen that is part of a remotely accessible configuration application package in accordance with embodiments of the present techniques. The configuration screen may be generally referred to by reference numeral 200. As illustrated, the configuration screen 200 comprises exemplary sub-screens that allow configuration of a markup language page for utilization as an HMI graphical interface screen. Specifically, the configuration screen 200 includes a development view sub-screen 202, a control object menu 204, and a properties sub-screen 206. While other screens and sub-screens may be employed, the present representation illustrates only certain exemplary aspects in accordance with present techniques. It should be noted that these screens may be accessed in accordance with the present techniques from a remote configuration station using a standard web browser.

The development view sub-screen 202 may include an HTML document creation screen that utilizes screen instructions and links to provide an operable HTML page. However, in some embodiments, the screen instructions are in a scripting language. The screen instructions may be programmed to facilitate navigation through various screens (e.g., HTML pages), programs, and functions corresponding to various different user inputs (e.g., input from a mouse). The links may reference and incorporate control objects adapted to facilitate interfacing of the HTML page with external input/output components. Indeed, a control object may be linked with an HTML page to facilitate an interface between an HMI and certain process components, where the HMI utilizes the HTML page as an operator interface screen. For example, in accordance with present techniques, by dragging-and-dropping a process object icon (e.g., "gauge" icon 208) from the control object menu 204 to the development screen 202, a control object may be incorporated graphically into development screen 202. Such a procedure may not only form a graphic 210 but it may also establish a specific control object for facilitating an interface between an HMI and a process. Further, the control object may facilitate configuration of its properties from a remote station via a browser.

Once a graphic, such as graphic 210, is properly located on the page being developed, the properties sub-screen 206 may become available for configuration in accordance with the present techniques. The illustrated properties sub-screen 206 relates to the graphic 210 and other corresponding aspects of the related control object. Such sub-screens may enable a user to define certain properties of related control objects. Indeed, the properties sub-screen 206 may enable a user to associate a control object related to the sub-screen 206 (including the corresponding graphic 210) with an input/output address (e.g., an I/O address on a PLC). For example, a user may associate a particular button with the register 16A on the control/monitoring device 16 illustrated by FIG. 1. Further, in accordance with present techniques, the properties sub-screen 206 may facilitate the incorporation of a tag or label (for identification of the control object), a physical address (for designating the location of related sensors and/or actuators), a dynamic visual component (e.g., logic to change graphic colors based on certain inputs), operational logic, and so forth. For example, a user may utilize the properties sub-screen 206 to link a control object including a representative graphic (e.g., a compressor graphic) to an I/O address in a PLC that is communicating with a status sensor. If the equipment is running, the graphic may be green. Alternatively, if the equipment is down, the graphic may be red. Additionally, logic in the related control object may send data to an I/O address on a PLC that is connected to an actuator, requesting that the actuator be energized based on the status of the equipment or other feedback.

Figure 4:
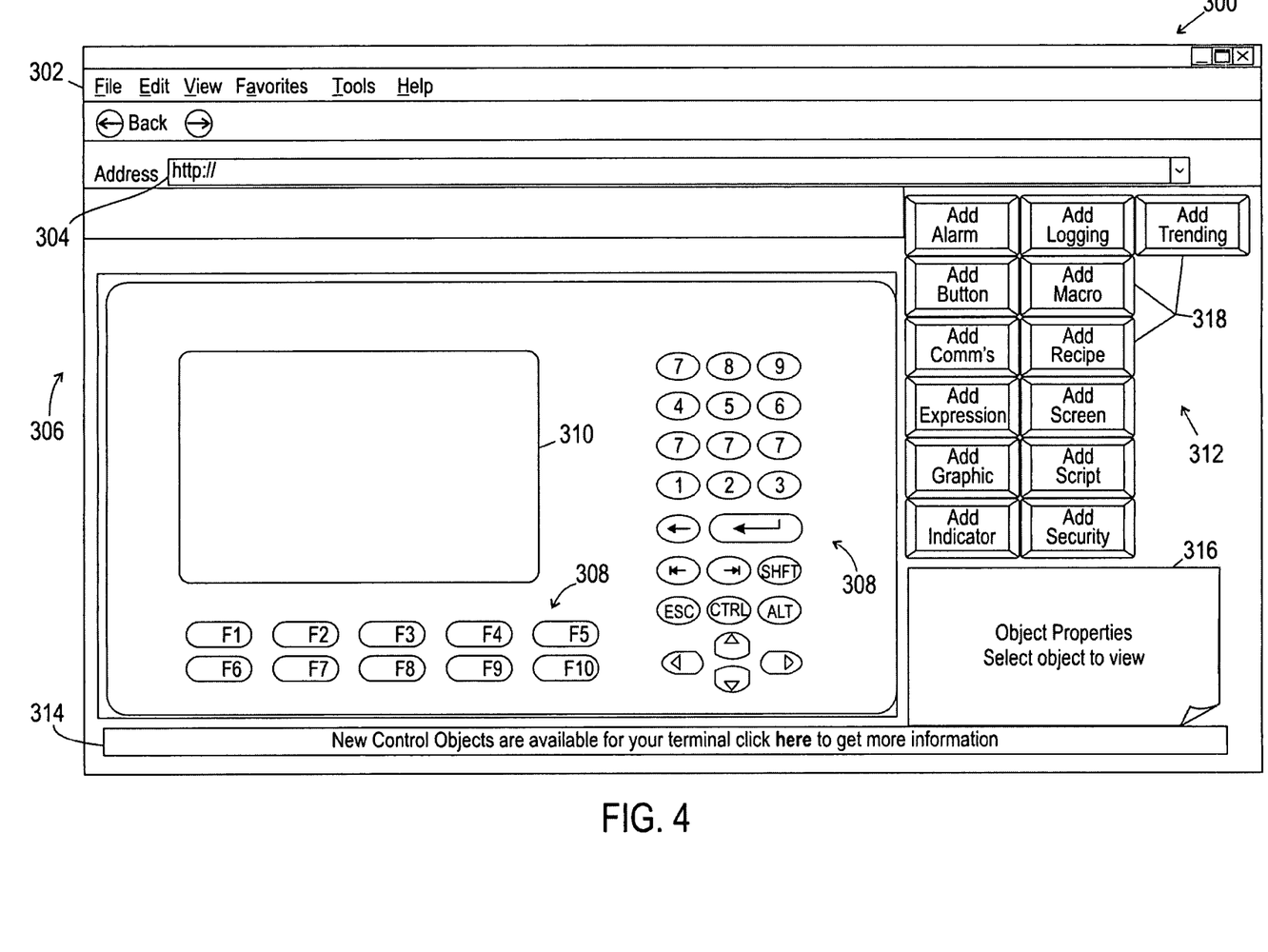
FIG. 4 is an exemplary representation of a configuration screen in accordance with present embodiments.

FIG. 4 is another exemplary representation of a configuration screen in accordance with present embodiments. Again, it should be noted that this screen may be remotely accessed. Specifically, FIG. 4 illustrates a browser development view 300 that may be accessed through a browser 302 from a remote station. Indeed, in accordance with present embodiments, this development view 300 may be accessed, much like any other web page, from a computer that is linked (e.g., via the Internet) to an HMI. For example, a user having appropriate access status may simply type an address into an address window 304 of the browser 302 and gain access to configuration of the HMI via the development view 300.

It should be noted that the illustrated embodiment of the browser development view 300 includes a development environment 306 that is representative of a physical HMI panel, including buttons 308 and a work screen 310. Indeed, to facilitate operational familiarity, the development environment 306 may include graphics and software functions that emulate configuration directly on the physical HMI. For example, a user may be able to virtually push the buttons 308 and manipulate the work screen 310 in a fashion similar to configuring the HMI directly. Accordingly, an operator that is accustomed to programming an HMI directly on the HMI in the field, may immediately be familiar with the browser development environment 306 because the appearance and functionality mirror an actual HMI.

In addition to the representation of the actual HMI, the development environment 306 may comprise an object assembly tool 312, an update notice banner 314, and an object properties view 316. The assembly tool 312 may comprise virtual buttons 318 that are adapted to implement or insert certain control objects and functions into HMI screens. For example, the push buttons 318 may add alarms, trending, graphics, macros, and so forth to a particular HMI screen. The update notice banner 314 may indicate to a user that certain upgrades are available for download to the HMI. For example, a message on the update notice banner 314 may indicate that new control objects for an object library residing on the HMI are available from a particular website. In some embodiments, the banner may automatically connect a user to the particular website when the banner 314 is selected (e.g., clicked on with a pointer). The object properties view 316 may indicate certain properties of an object that is selected from the work screen 310. For example, a graphic object representing a pump may be selected on the work screen 310 and properties related to the object such as a tag, a register, a physical address, operational logic, and so forth may then be illustrated in the properties view 316. Other screens and sub-screens may be employed, and the present representation illustrates only certain exemplary aspects in accordance with present techniques.

Figure 5:
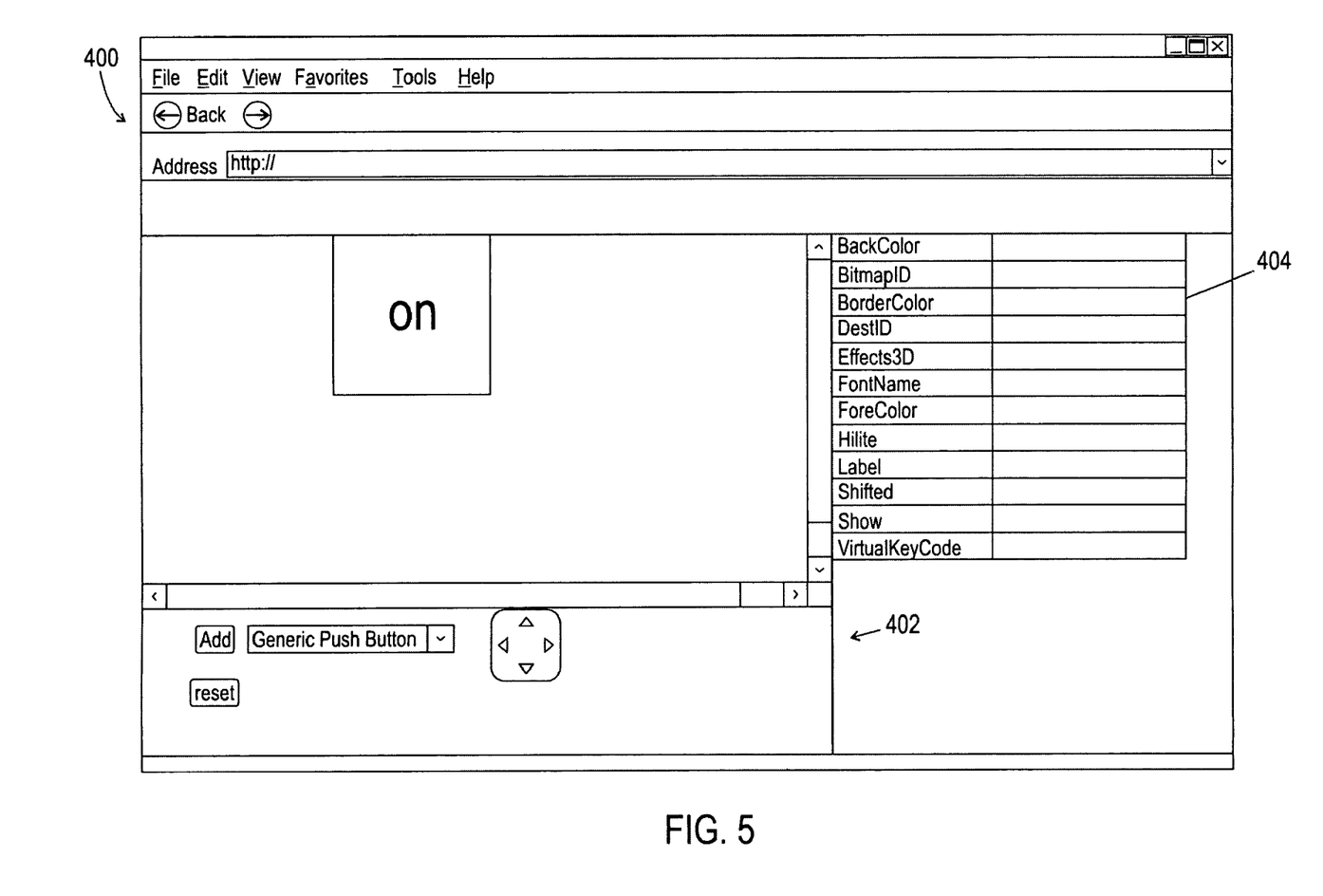
FIG. 5 is an exemplary representation of an object configuration screen in accordance with present embodiments.

FIG. 5 is an exemplary representation of an object configuration screen in accordance with present embodiments. The object configuration screen may be generally referred to as screen 400. Specifically, the screen 400 may be a screen that is accessible from the development environment 306 and that facilitates direct configuration of objects and graphics through a browser. For example, a user may select a push button 318 in the development environment 306 that adds an on/off button to an HMI graphic. Upon adding the on/off button, sub-screen 402 may be accessed and displayed on the browser 302 to facilitate configuration of aspects of the on/off button. For example, visual properties (e.g., color and font) and dynamic links (e.g., associated I/O address) of the on/off button may be edited in sub-screen 402. Further, tools available in a sub-screen 404 may be utilized to manipulate the on/off button graphic and/or add additional graphics and modules from an object library. It should be noted that configuration of an object relating to the on/off button through the browser is a direct configuration of that object on the HMI in accordance with present techniques.

Figure 6:
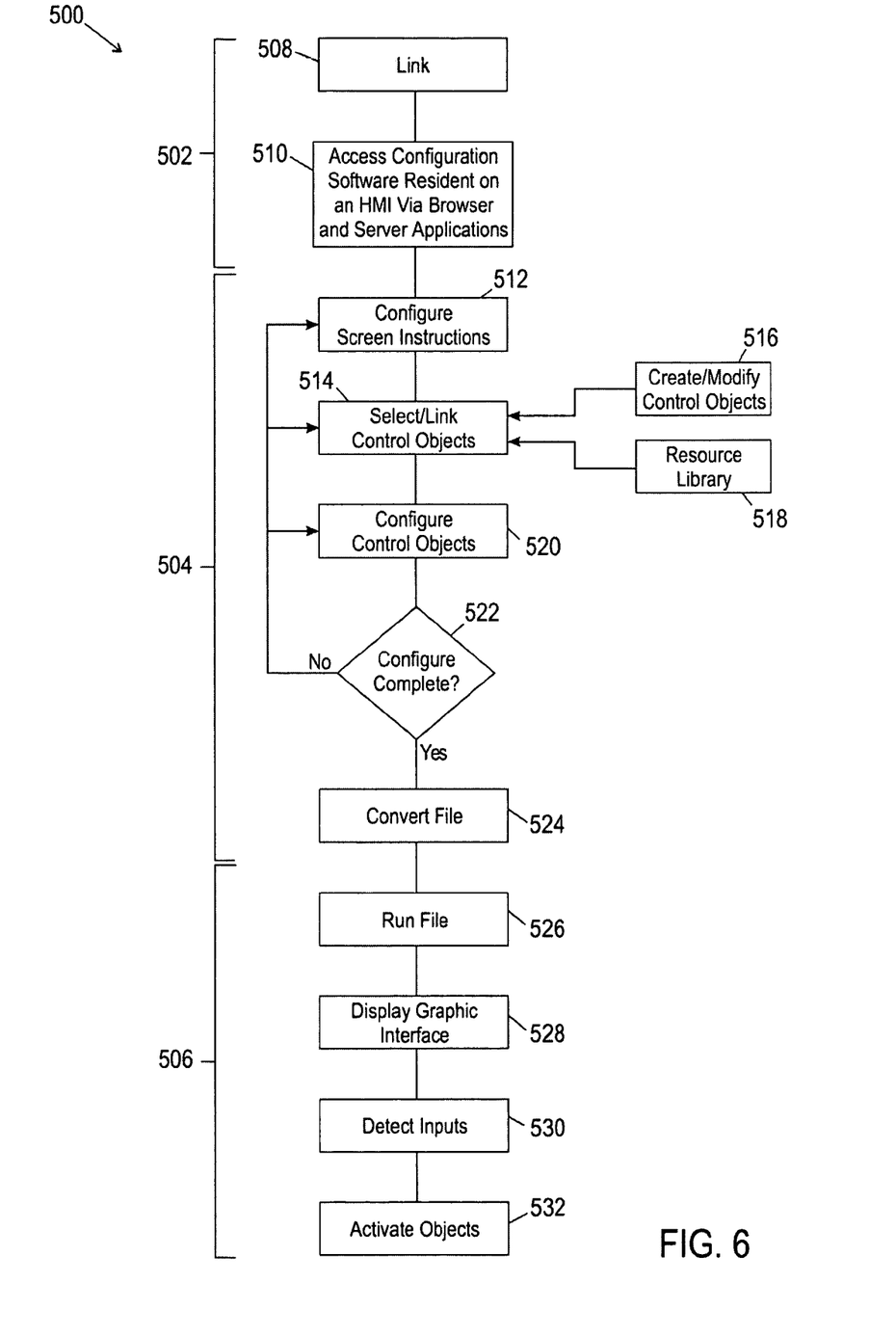
FIG. 6 is a block diagram illustrating a method for remotely configuring and implementing an application using a standard interface in accordance with embodiments of the present techniques.

FIG. 6 is a block diagram illustrating a method for remotely configuring and implementing an application (e.g., graphical interface) using a standard interface in accordance with embodiments of the present techniques. The method may be generally referred to by reference numeral 500. Specifically, the method 500 may incorporate various procedures relating to different phases of operation. While FIG. 6 separately delineates specific procedures, in other embodiments, individual procedures may be split into multiple procedures or combined into a single procedure. In particular, the method 500 comprises a connection phase 502, a configuration phase 504, and an operation phase 506.

The connection phase 502, in accordance with the present techniques, includes linking an HMI to a configuration station (block 508) and accessing control objects and/or configuration software (block 510) that are resident on the HMI via server and browser applications. Once access is established, the control objects and configuration application may be utilized in the configuration phase 504 to develop interface screens for the HMI, via the configuration station. It should be noted that linking the HMI and configuration station (block 508) may comprise the utilization of a network interface, direct connect cable or any other suitable connection, as discussed previously. Alternatively, if remote access is not desired, a browser program on the HMI itself may be used to access the control objects and configuration application on the HMI without establishing a link to a remote device.

Once access to the configuration application is established, assembly of a screen, which may take the form of a markup page, may begin in the configuration phase 504. The configuration phase may comprise configuring screen instructions (block 512) for the screen and selecting/linking control objects (block 514). Specifically, block 512 may represent writing background instructions for coordinating aspects of a typical input device with the markup page and for other related functions. For example, the screen instructions may coordinate certain keyboard inputs with particular software functions (e.g., opening a software application when a particular button or virtual button is pushed). The screen may be further configured by selecting/linking control objects (block 514) to aspects of the screen, thus incorporating the control objects as functional elements. This selecting/linking procedure (block 514) may include the creation/modification of control objects (block 516), and more particularly, of their properties, and the importation of control objects from a resource library (block 518). For example, as discussed previously, a new control object may be added to the HMI by retrieving it through the internet and downloading it to the HMI. Additionally, the configuration tool on the HMI may allow a user to modify existing control objects and implement the modified versions in an operation environment.

In accordance with embodiments of the present techniques, the control objects being selected and linked in block 514 may require configuration. Such a procedure is illustrated by block 520, which may represent defining certain properties in control objects that enable the control objects to interface with external process components (e.g., I/O addresses on a PLC). It should be noted that this configuration procedure (block 520) may be integral to the development of screens or may occur in a separate procedure. For example, each time a control block is linked to screens, it may require configuration. Alternatively, a control block may be linked and configured at any time. Block 522 represents a decision block. If the configuration is complete, the method may proceed to block 524. Alternatively, configuration may continue as illustrated. The result of the configuration phase in accordance with embodiments of the present technique may be the creation of a display file, as illustrated by block 524. After being developed, this resulting display file may be implemented as an operational graphical interface (block 526) and utilized in the operation phase 506.

The operation phase 506 may comprise the actual implementation of the configured screen as a graphical interface on an HMI. Specifically, the procedures for such an implementation may include running the display file (block 526) created in block 524. This may result in the display of the graphical interface on a user-viewable screen of the HMI or on a screen linked to the HMI through server and browser applications, as illustrated by block 528. Further, running the display file (block 526) may enable the detection of system and user inputs (block 530) in addition to activating the control objects (block 532). Indeed, an HMI may comprise embedded code and a server that enable a standard internet browser to navigate and implement a number of such graphical displays and related control objects. Thus, embodiments of the present techniques may interact with a process to form a control and monitoring system using a standard web interface (e.g., HTML page).

Figure 7:
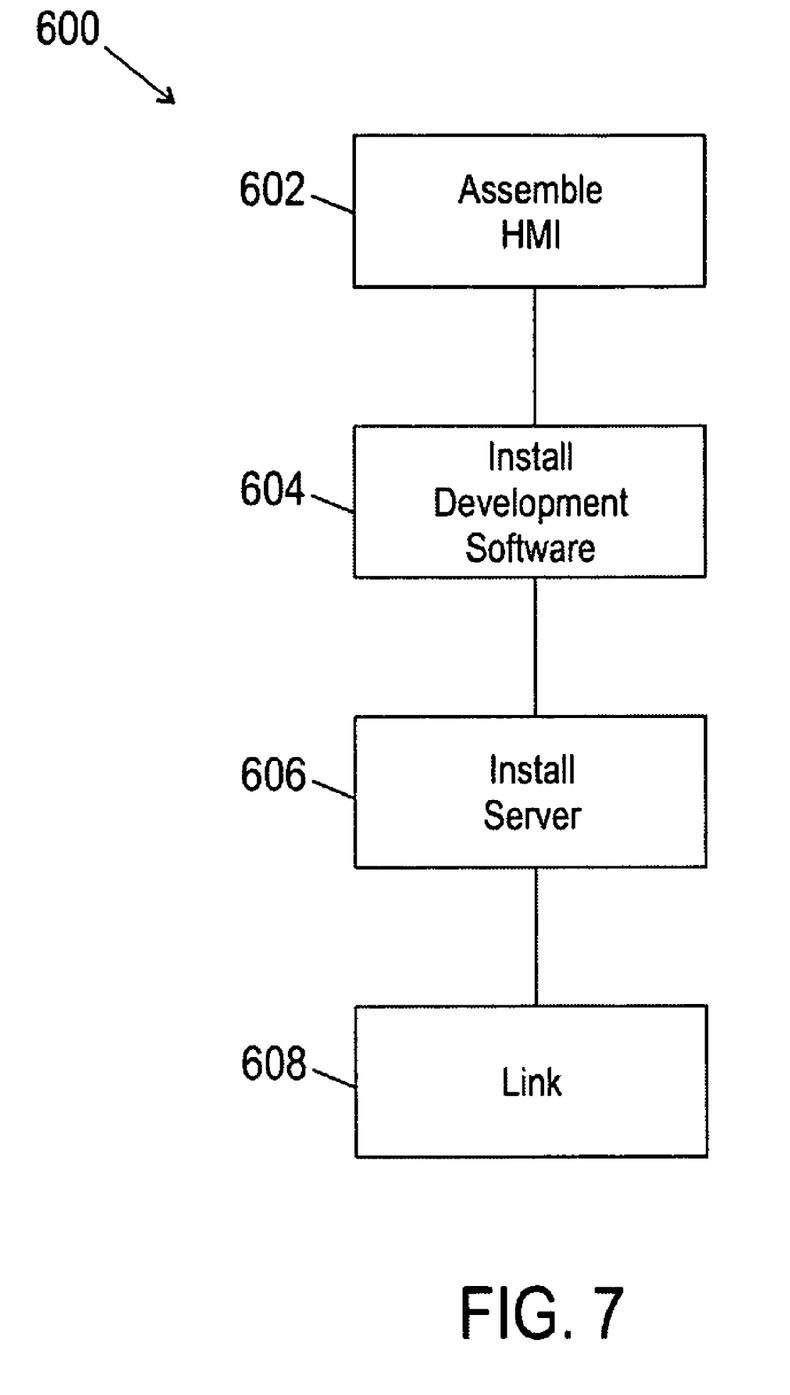
FIG. 7 is a block diagram illustrating a method for assembling and implementing a configurable interface adapted for remote configuration using a standard interface in accordance with embodiments of the present techniques.

FIG. 7 is a block diagram illustrating a method for assembling and implementing an HMI adapted for remote configuration using a standard interface in accordance with embodiments of the present techniques. The method may be generally referred to by reference numeral 600. Method 600 may comprise assembling an HMI (block 602), installing a development package (e.g., control objects) on the HMI (block 604), installing server software (e.g., a web server) on the HMI (block 606), and linking the HMI to a remote computer (block 608). Once the link is established between the HMI and remote computer, a user may remotely configure the HMI. As discussed above, the remote computer may have browser software that is adapted to access the development package on the HMI via the server. Further, as discussed above, the access may be limited by security measures (e.g., passwords and user status). It should be noted, here again, that configuration need not be done directly on the HMI. Indeed, a virtual HMI may be established for configuration in accordance with embodiments of the present techniques. For example, a user may configure a virtual HMI without having a physical HMI present. Once configured, the virtual HMI may be transferred to an actual HMI.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A configurable human-machine interface, comprising:
   screen instructions for generating configurable views to be displayed on a display and calling upon functional modules based upon inputs received via an input device, the functional modules for interpreting inputs received via the input device, processing parameter signals received from remote devices, and generating output signals;
   a development environment stored on the human-machine interface for configuring the screen instructions; and
   a server application stored within the human-machine interface for serving the development environment to a browser application.

2. The interface of claim 1, comprising a library of the functional modules stored on the human-machine interface.

3. The interface of claim 1, comprising a communications protocol interface for remotely addressing the human-machine interface to permit reconfiguration of the functional modules and the screen instructions via an Internet protocol.

4. The interface of claim 1, comprising a data exchange interface configured to receive the parameter signals and send the output signals in an industrial data exchange protocol.

5. The interface of claim 1, comprising a configuration application adapted to access the development environment.

6. The interface of claim 1, wherein the development environment comprises a graphical display that emulates a physical human-machine interface.

7. The interface of claim 1, comprising a viewable display.

8. The interface of claim 1, wherein the configuration tool permits adding, editing, or deletion of new functional modules to the human-machine interface.

9. The interface of claim 1, wherein the configurable views include a static view and dynamic elements, the dynamic elements being altered in appearance based upon the parameter signals received by the human-machine interface.

10. The interface of claim 9, wherein the dynamic elements include parameter values of networked components.

11. The interface of claim 1, wherein the screen instructions are defined in markup language.

12. The interface of claim 1, wherein the browser application is stored on the human-machine interface.

13. A configurable human-machine interface, comprising:
    a development environment comprising:
        functional modules stored on the human-machine interface, the functional modules adapted to process parameter signals received from remote devices, communicate properties of the functional modules to a browser, and enable reconfiguration of the properties of the functional modules through the browser;
        screen instructions for generating configurable views to be displayed on a display and adapted for calling upon the functional modules based upon inputs received via an input device; and
    a server stored within the human-machine interface for serving the development environment to the browser.

14. The interface of claim 1, wherein the functional modules are adapted to interpret inputs received via the input device.

15. The interface of claim 1, wherein the functional modules are adapted to generate output signals.

16. A method for configuring a human-machine interface, comprising:
    accessing a server application stored on the human-machine interface; and
    accessing, via the server application, a development environment stored on the human-machine interface, the development environment permitting configuration of screen instructions for generating configurable views to be displayed on a display and calling upon functional modules based upon inputs received via an input device, the functional modules for interpreting inputs received via the input device, processing parameter signals received from remote devices, and generating output signals.

17. The method of claim 16, further comprising accessing, via the server application, at least one functional module stored on the human-machine interface.

18. The method of claim 16, further comprising accessing at least one functional module from a remote library of functional modules.

19. The method of claim 16, wherein the server application is accessed via a browser application.

20. The method of claim 16, wherein the development environment includes a configuration application for configuring screens comprising graphical interface elements to be displayed on the human-interface module.

21. A method for configuring a human-machine interface, comprising:
    serving, via a server application stored on the human-machine interface, a development environment for configuring screens comprising graphical interface elements to be displayed on the human-interface module, the screens including instructions for generating configurable views to be displayed on a display and calling upon functional modules based upon inputs received via an input device, the functional modules for interpreting inputs received via the input device, processing parameter signals received from remote devices, and generating output signals.

22. A computer readable medium comprising:
a server application stored on the human-machine interface, a development environment for configuring screens comprising graphical interface elements to be displayed on the human-interface module, the screens including instructions for generating configurable views to be displayed on a display and calling upon functional modules based upon inputs received via an input device, the functional modules for interpreting inputs received via the input device, processing parameter signals received from remote devices, and generating output signals.

23. A configurable interface, comprising:
screen instructions for generating configurable views to be displayed on a display and calling upon functional modules based upon inputs received via an input device, the functional modules for interpreting inputs received via the input device, and generating output signals;
a development environment stored on the configurable interface for configuring the screen instructions; and
a server application stored within the configurable interface for serving the development environment to a general purpose viewer.

24. The configurable interface of claim 23, comprising a library of the functional modules stored on the configurable interface.

25. The interface of claim 23, comprising a communications protocol interface for remotely addressing the configurable interface to permit reconfiguration of the functional modules and the screen instructions via an Internet protocol.

26. The configurable interface of claim 23, comprising a data exchange interface configured to receive the parameter signals and send the output signals in an industrial data exchange protocol.

27. The configurable interface of claim 23, comprising a configuration application adapted to access the development environment.

28. The configurable interface of claim 23, wherein the interface is configured to read data from a remote register or write data to a remote register in response to inputs received via the configurable views.

* * * * *